US008270455B2

(12) United States Patent
Sanji et al.

(10) Patent No.: US 8,270,455 B2
(45) Date of Patent: Sep. 18, 2012

(54) WIRELESS COMMUNICATION SYSTEM

(75) Inventors: Kenichiro Sanji, Okazaki (JP); Akira Takaoka, Okazaki (JP); Hiromichi Naito, Okazaki (JP)

(73) Assignees: Denso Corporation, Kariya, Aichi-Pref. (JP); Nippon Soken, Inc., Nishio, Aichi-Pref. (JP)

( * ) Notice: Subject to any disclaimer, the term of this patent is extended or adjusted under 35 U.S.C. 154(b) by 641 days.

(21) Appl. No.: 12/492,347

(22) Filed: Jun. 26, 2009

(65) Prior Publication Data

US 2009/0323772 A1 Dec. 31, 2009

(30) Foreign Application Priority Data

Jun. 26, 2008 (JP) ................................. 2008-167707

(51) Int. Cl.
H04B 1/00 (2006.01)

(52) U.S. Cl. ........ 375/142; 375/141; 375/140; 375/130; 375/367; 370/203

(58) Field of Classification Search .................... 375/142
See application file for complete search history.

(56) References Cited

U.S. PATENT DOCUMENTS

| | | | | |
|---|---|---|---|---|
| 5,943,362 A * | 8/1999 | Saito | ............................. | 375/143 |
| 6,052,408 A * | 4/2000 | Trompower et al. | .......... | 375/141 |
| 6,353,776 B1 * | 3/2002 | Rohrl et al. | ............... | 340/426.16 |
| 7,762,470 B2 * | 7/2010 | Finn et al. | ..................... | 235/492 |
| 2001/0030996 A1 * | 10/2001 | Sato et al. | ..................... | 375/152 |
| 2002/0106989 A1 | 8/2002 | Aizawa et al. | | |
| 2003/0031149 A1 * | 2/2003 | Odenwalder et al. | ......... | 370/337 |
| 2003/0067964 A1 * | 4/2003 | Li | ..................... | 375/141 |
| 2003/0069044 A1 * | 4/2003 | Yotsumoto | ..................... | 455/561 |
| 2003/0219082 A1 * | 11/2003 | Tanaka et al. | ................. | 375/324 |
| 2005/0041726 A1 * | 2/2005 | Rouphael et al. | ............. | 375/150 |
| 2006/0039453 A1 * | 2/2006 | Yamada | ....................... | 375/150 |
| 2006/0193373 A1 * | 8/2006 | Agee et al. | ..................... | 375/141 |
| 2007/0016362 A1 * | 1/2007 | Nelson | ......................... | 701/200 |
| 2008/0075150 A1 * | 3/2008 | Rouphael et al. | ............. | 375/150 |

(Continued)

FOREIGN PATENT DOCUMENTS

JP 5-219011 8/1993

(Continued)

OTHER PUBLICATIONS

Japanese Office Action dated Jun. 22, 2010, issued in corresponding Japanese Application No. 2008-167707, with English translation.

*Primary Examiner* — David Ometz
*Assistant Examiner* — Santiago Garcia
(74) *Attorney, Agent, or Firm* — Nixon & Vanderhye PC

(57) ABSTRACT

In a wireless communication system, a portable device and an in-vehicle device wirelessly communicate with each other by a spread spectrum method. The in-vehicle device transmits a synchronization signal indicative of a reference period to the portable device. The in-vehicle device performs code acquisition for only a portion of a spread wireless signal received from the portable device. The portion has a starting point in a search period from a search start point to a search end point. The search start point is identified based on the reference period and a predetermined first correction time. The search end point is identified based on the reference period and a predetermined second correction time.

3 Claims, 6 Drawing Sheets

U.S. PATENT DOCUMENTS

| | | | |
|---|---|---|---|
| 2008/0129445 A1* | 6/2008 | Kraimer et al. | 340/5.2 |
| 2008/0212699 A1* | 9/2008 | Imaeda et al. | 375/260 |
| 2008/0232431 A1* | 9/2008 | Sanji et al. | 375/130 |
| 2008/0246586 A1* | 10/2008 | Hiramine | 340/5.72 |
| 2008/0285630 A1* | 11/2008 | Patrick | 375/142 |
| 2009/0150310 A1* | 6/2009 | Okada | 706/12 |
| 2009/0323772 A1 | 12/2009 | Sanji et al. | |
| 2010/0135358 A1* | 6/2010 | McCorkle | 375/130 |
| 2010/0232478 A1* | 9/2010 | Sanji et al. | 375/150 |
| 2011/0128995 A1* | 6/2011 | Sanji et al. | 375/145 |

FOREIGN PATENT DOCUMENTS

| | | |
|---|---|---|
| JP | 8-237170 | 9/1996 |
| JP | 08-331099 | 12/1996 |
| JP | 10-65576 | 3/1998 |
| JP | 11-41140 | 2/1999 |
| JP | 2000-252870 | 9/2000 |
| JP | 2005-207019 | 8/2005 |
| JP | 2008-060941 | 3/2008 |
| JP | 2008-231734 | 10/2008 |
| JP | 2010-11061 | 1/2010 |

* cited by examiner

WIRELESS COMMUNICATION SYSTEM

CROSS REFERENCE TO RELATED APPLICATION

This application is based on and incorporates herein by reference Japanese Patent Application No. 2008-167707 filed on Jun. 26, 2008.

FIELD OF THE INVENTION

The present invention relates to a wireless communication system in which a portable device carried by a user transmits a wireless signal to an in-vehicle unit mounted on a vehicle by a spread spectrum method.

BACKGROUND OF THE INVENTION

In a spread spectrum method, an original signal is spread by a spread code at the transmitting end to generate a spread signal, and the spread signal is despread by the spread code at the receiving end to recover the original signal. The receiving end needs to synchronize with, i.e., acquire the spread code coming from the transmitting end in order to despread the spread signal. Achieving this synchronization is generally called "code acquisition".

It has been known that the code acquisition is typically performed by using a sliding correlator or a matched filter.

Other methods for code acquisition have been disclosed, for example, in JP-A-H5-219011 and JP-A-H8-237170. In the method disclosed in JP-A-H5-219011, the number of matches between a received signal and a spread code are counted to detect a synchronization point, and it is determined that the synchronization point is detected when the counted number of matches exceeds a predetermined threshold. Therefore, the speed of the code acquisition can be enhanced. In the method disclosed in JP-A-H8-237170, a non-spread preamble is inserted between bits of a spread transmitted signal, and the receiving end detects a synchronization point based on the non-spread preamble.

In the method using the sliding correlator, a multiply accumulate operation between one period of a received signal from a certain start point and one period of a spread code is performed to detect a synchronization point. This operation is repeated by shifting the start point until the synchronization point is detected.

Since there is a possibility that the operation is repeated a number of times until the synchronization point is detected, the code acquisition may take much time to be completed. As a result, system responsibility may be worsened.

In the method using the matched filter, multiply accumulate operations between multiple periods having shifted start points and the spread code are performed in parallel to detect the synchronization point. Therefore, as compared to in the method using the sliding correlator, the code acquisition can be completed in a short time.

However, using a matched filter corresponds to using multiple sliding correlators that are arranged in parallel. In the method using the matched filter therefore, cost, circuit size, and power consumption may be increased as compared to in the method using the sliding correlator. Further, although the method using the matched filter enhances the speed of the code acquisition by measuring correlation (self-correlation) between the received signal and the spread code in parallel, the number of times the correlation is measured is the same between the method using the sliding correlator and the method using the matched filter.

In the method disclosed in JP-A-H5-219011, the transmitting end is required to transmit only fixed value data until the code acquisition is completed. Further, since there is a need to inform completion of the code acquisition of the transmitting end, additional time is required before data is received after the completion of the code acquisition.

In the method disclosed in JP-A-H8-237170, transmission time is increased by the preamble. Therefore, transmission speed is worsened by the preamble at the time of normal transmission and reception after the code acquisition is completed.

In summary, although the methods disclosed in JP-A-H5-219011 and JP-A-H8-237170 may simplify code acquisition, the methods may require additional structure to the transmitting end and may cause a reduction in data transmission speed after code acquisition.

SUMMARY OF THE INVENTION

In view of the above it is an object of the present invention to provide a wireless communication system in which code acquisition is achieved in a reduced time so that responsibility can be improved.

According to an aspect of the present invention, a wireless communication system includes a portable device carried by a user and an in-vehicle device mounted on a vehicle. The portable device spreads a wireless signal by a first spread code to transmit a first spread wireless signal to the in-vehicle device. The in-vehicle device includes a sliding correlator or a matched filter. The in-vehicle device receives the first spread wireless signal and despreads the first spread wireless signal by a second spread code identical to the first spread code to wirelessly communicate with the portable device by a spread spectrum method. The in-vehicle device transmits a synchronization signal to the portable device to inform the portable device of a reference period determined by the in-vehicle device. The portable device changes the first spread code synchronously with the synchronization signal upon reception of the synchronization signal and spreads the wireless signal by the changed first spread code to transmit a second spread wireless signal. The in-vehicle device receives the second spread wireless signal and performs code acquisition for only a portion of the second spread wireless signal by using the sliding correlator or the matched filter. The portion of the second spread wireless signal has a starting point in a search period. The in-vehicle device changes the second spread code synchronously with the second spread wireless signal upon success of the code acquisition and despreads the second spread wireless signal by the changed second spread code. The search period is from a search start point to a search end point and shorter than the reference period. The search start point is identified based on the reference period and a predetermined first correction time that is equal to a time difference between the search start point and a starting point of the reference period. The search end point is identified based on the reference period and a predetermined second correction time that is equal to a time difference between the search end point and the starting point of the reference period.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENT

A wireless communication system according to an embodiment of the present invention is described below. The wireless communication system has both a so-called keyless smart entry function and a so-called keyless remote entry function. For example, the keyless smart entry function can unlock a door of a vehicle, when a specific portable device carried by an authorized user of the vehicle enters a predetermined wireless communication area around the vehicle. For example, the keyless remote entry function can lock and unlock the door of the vehicle in response to operation of a button on the portable device.

Figure 1:
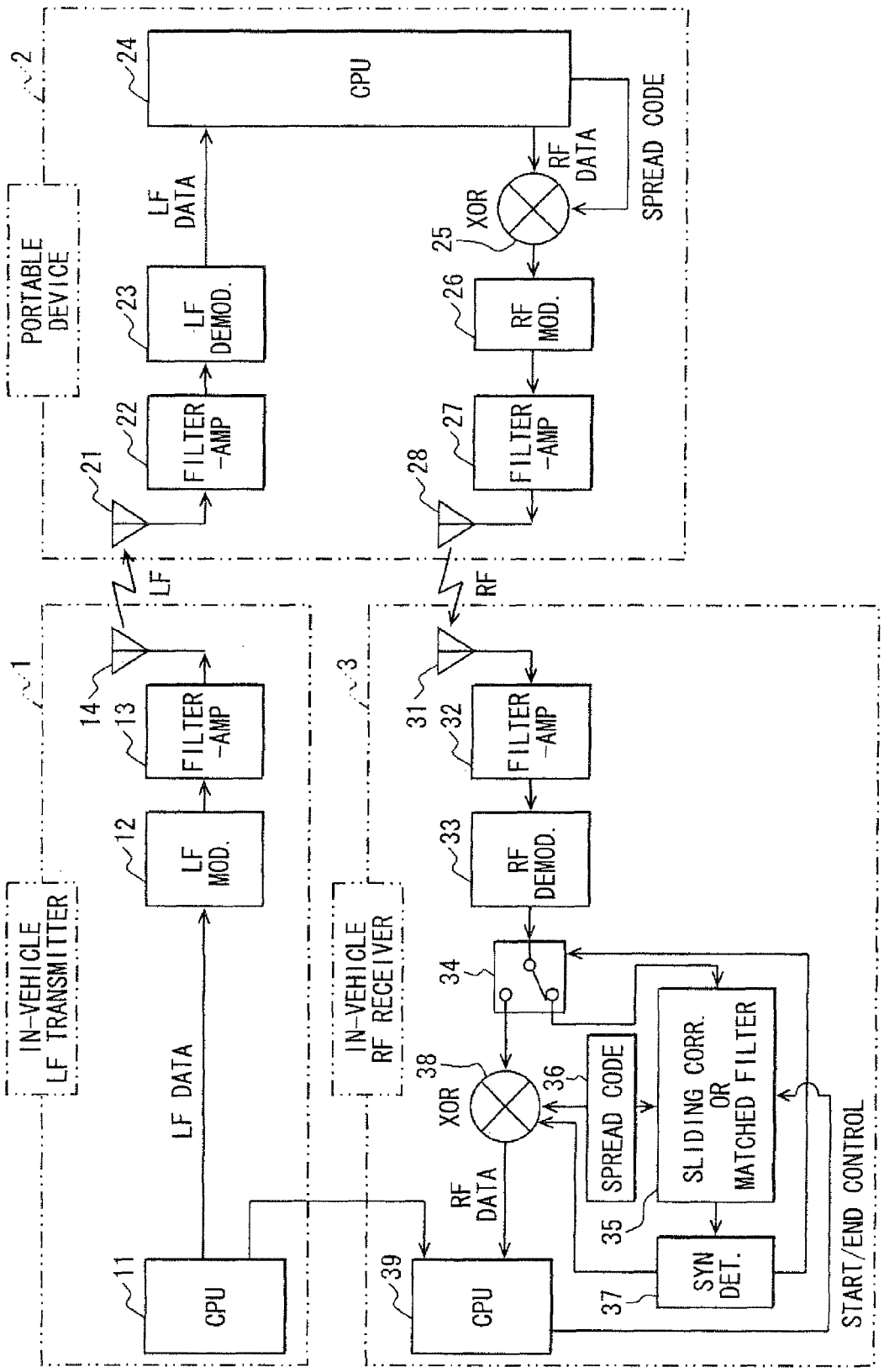
FIG. 1 is a block diagram of a wireless communication system according to an embodiment of the present invention.

FIG. 1 is a block diagram of the wireless communication system. The wireless communication system includes an in-vehicle LF transmitter 1, a portable device 2, and an in-vehicle RF receiver 3.

The in-vehicle LF transmitter 1 can transmit a LF wireless signal of a low frequency band to the portable device 2. The portable device 2 can transmit a RF wireless signal of a radio frequency band to the in-vehicle RF receiver 3 by a spread spectrum method. Each of the in-vehicle LF transmitter 1 and the in-vehicle RF receiver 3 is mounted on the vehicle. The portable device 2 is carried by the user.

The in-vehicle LF transmitter 1 includes a central processing unit (CPU) 11, a LF modulator 12, a filter-amplifier 13, and a LF transmitting antenna 14. The CPU 11 outputs LF data containing a synchronization signal to the LF modulator 12. The LF data is modulated by the LF modulator 12, passed through the filter-amplifier 13, and then transmitted to the LF transmitting antenna 14. Further, the CPU 11 can output a synchronization signal to the in-vehicle RF receiver 3.

The portable device 2 includes a LF receiving antenna 21, a filter-amplifier 22, a LF demodulator 23, a CPU 24, an exclusive OR (XOR) operation circuit 25, a RF modulator 26, a filter-amplifier 27, and a RF transmitting antenna 28.

The LF wireless signal transmitted from the in-vehicle LF transmitter 1 is received by the LF receiving antenna 21, passed through the filter-amplifier 22, and then demodulated by the LF demodulator 23. Thus, the LF data containing the synchronization signal is transmitted to the CPU 24.

When the LF data containing the synchronization signal is transmitted to the CPU 24, the CPU 24 outputs RF data and spread code synchronously with the synchronization signal. The RF data and the spread code outputted from the CPU 24 are inputted to the XOR operation circuit 25. An output of the XOR operation circuit 25 is modulated by the RF modulator 26, passed through the filter-amplifier 27, and then transmitted to the RF transmitting antenna 28.

The in-vehicle RF receiver 3 includes a RF receiving antenna 31, a filter-amplifier 32, a RF demodulator 33, a switch 34, a sliding correlator 35, a spread code generator 36, a synchronization detector 37, a XOR operation circuit 38, and a CPU 39. A matched filter can be used instead of the sliding correlator 35.

The RF wireless signal transmitted from the portable device 2 is received by the RF receiving antenna 31, passed through the filter-amplifier 32, and then demodulated by the RF demodulator 33. A destination of an output of the RF demodulator 33 can be changed by the switch 34. At the time prior to code acquisition, the output of the RF demodulator 33 is transmitted through the switch 34 to the sliding correlator 35.

Further, spread code outputted from the spread code generator 36 is inputted to the sliding correlator 35. Thus, in the sliding correlator 35, correlation observation is performed during one period of the spread code based on an input (i.e., received signal) from the RF demodulator 33 and an input (i.e., spread code) from the spread code generator 36.

In this case, the sliding correlator 35 identifies a starting point, indicated by the CPU 39, from the input (i.e., received signal) from the RF demodulator 33 based on a synchronization point detection start control signal outputted from the CPU 39. Then, the sliding correlator 35 performs correlation observation of the received signal of one period from the identified starting point during one period of the spread code and outputs an observation result signal representing a result of the correlation observation to the synchronization detector 37.

When the correlation observation of the received signal of one period is completed, the starting point is shifted by a predetermined unit time. Then, the sliding correlator 35 performs correlation observation of the received signal of one period from the shifted starting point during one period of the spread code. Such a correlation observation is repeated, until a synchronization point is detected or a synchronization point detection end control signal is outputted from the CPU 39.

As mentioned previously, a matched filter can be used instead of the sliding correlator 35. Differences between a case where a sliding correlator is used and a case where a matched filter is used are timing and frequency at which the observation result signal is outputted to the synchronization detector 37. Specifically, in the case where a sliding correlator is used, after the starting point is shifted by a predetermined unit time, and then one period of the received signal is received again, the observation result signal is outputted to the synchronization detector 37. By contrast, in the case where a matched filter is used, a portion of the received signal is used again for correlation observation of next period of the received signal. When receiving new signal of the predetermined unit time, the observation result signal is outputted to the synchronization detector 37 in a range where the starting point is shifted by the predetermined unit time.

The above differences are derived from original differences between a sliding correlator and a matched filter and not unique to the embodiment. Depending on whether a sliding correlator or a matched filter is used, there is a need to optimize the timing at which the CPU 39 outputs the synchronization point detection end signal after the synchronization point detection end signal.

The synchronization detector 37 detects the synchronization point based on the observation result signal outputted from the sliding correlator 35. Upon detection of the synchronization point, the synchronization detector 37 switches the switch 34 to the XOR operation circuit 38 so that an output of the RE demodulator 33 can be inputted to the XOR operation circuit 38.

Further, the spread code outputted from the spread code generator 36 is inputted to the XOR operation circuit 38. RF data outputted from the XOR operation circuit 38 is inputted to the CPU 39. The RF data is despread data. Upon reception of the RF data, the CPU 39 performs processing necessary to control functions such as the keyless remote entry function and the keyless smart entry function.

The processing necessary to control the functions can be performed by a CPU other than the CPU 39. In this case, the CPU 39 forwards the RF data to the other CPU.

For example, the CPU 39 can perform a part or all of authentication procedures such as determining whether code in the received RF data matches with code stored in its memory. In such a case, if a part or all of authentication conditions are satisfied, the CPU 39 can transmit to the other CPU a signal indicating that the authentication conditions are satisfied. Then, the other CPU can perform the processing necessary to control the functions.

For example, the processing necessary to control the functions can include locking and unlocking the door and starting an engine.

(Example of a Code Acquisition Timing)

An example of a code acquisition timing of the wireless communication system is described below with reference to FIG. 2.

Figure 2:
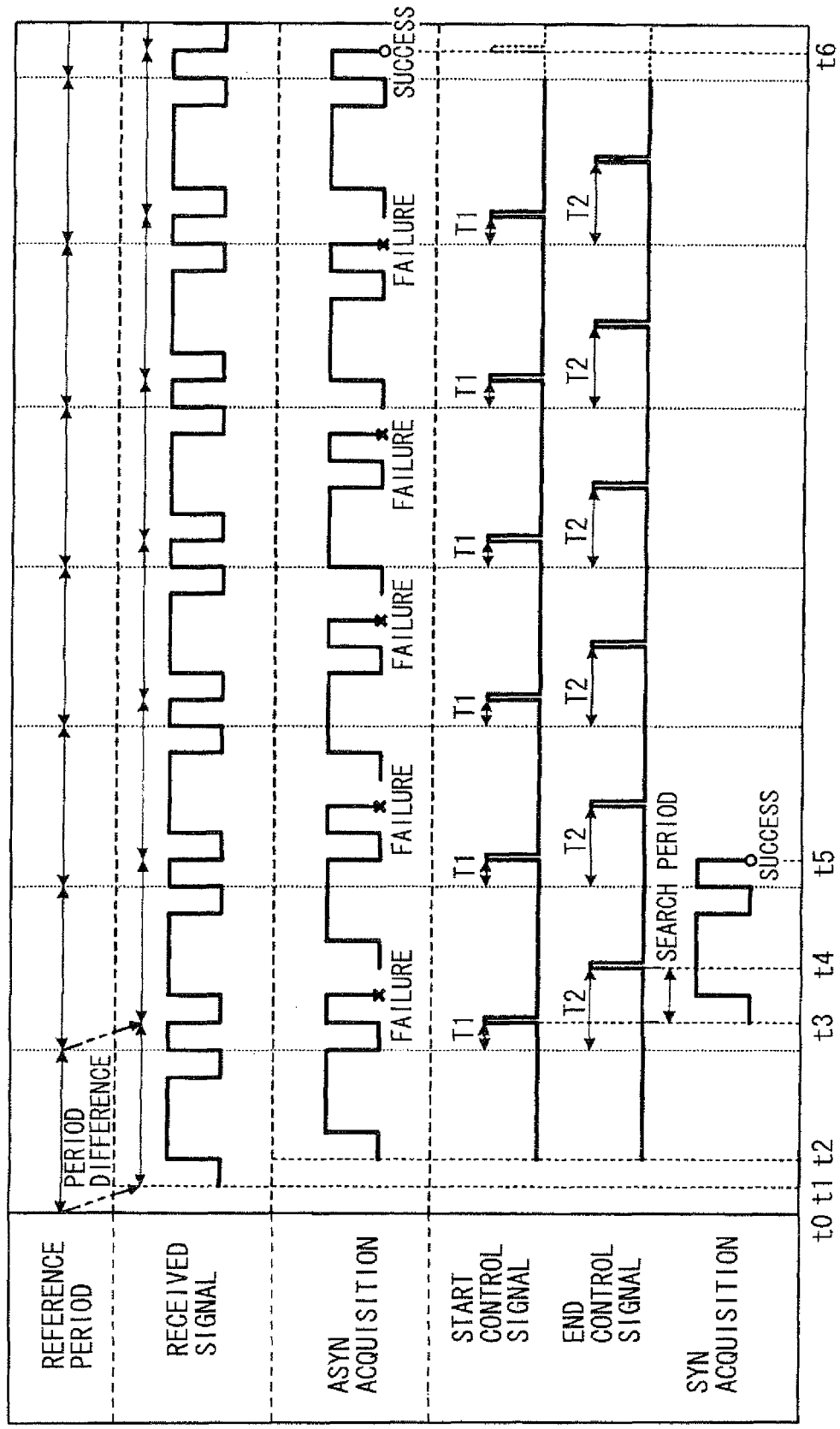
FIG. 2 is a timing diagram illustrating code acquisition performed by a typical method and code acquisition performed by a method according to the embodiment.

FIG. 2 is a diagram illustrating timing charts of a reference period defined by the in-vehicle LF transmitter 1, an actual received signal from the portable device 2, asynchronous code acquisition performed by a typical sliding correlator based on the received signal, and synchronous code acquisition performed by using the synchronization point detection start and end control signals.

The in-vehicle LF transmitter 1 has an initiative to determine the reference period. Each of the portable device 2 and the in-vehicle RF receiver 3 operates synchronously with the in-vehicle LF transmitter 1 based on the synchronization signal transmitted from the in-vehicle LF transmitter 1. In this way, synchronization between the in-vehicle LF transmitter 1, the portable device 2, and the in-vehicle RF receiver 3 is adjusted based on the synchronization signal.

Typically, a detection time for a received signal strength indication (RSSI) in the portable device 2 varies depending on a distance between the in-vehicle LF transmitter 1 and the portable device 2. Therefore, the detection time can have a certain amount of variation. Also, a circuit delay time of each of the in-vehicle LF transmitter 1, the portable device 2, and the in-vehicle RF receiver 3 can have a certain amount of variation.

As shown in FIG. 2, if the sum of these variations becomes large, a difference occurs between the reference period and a period of the received signal. In FIG. 2, although the reference period starts from a time t0, the period of the received signal starts from a time t1.

In a case where the period difference occurs, even when the in-vehicle RF receiver 3 causes the spread code to change synchronously with the reference period, the in-vehicle RF receiver 3 cannot despread the received signal from the portable device 2 by using the spread code. Therefore, in such a case, there arises a need to perform code acquisition based on the received signal by using a sliding correlator or a matched filter.

Referring to FIG. 2, an example of asynchronous code acquisition performed asynchronously with the reference period by using a typical sliding correlator is described. In FIG. 2, the received signal starts to be received at the time t1, and the asynchronous code acquisition can start at a time t2. In this case, after a signal of one period from the time t2 is received, the received signal is multiplied and accumulated with one period of the spread code. The synchronous point is detected based on the result of the multiply-accumulate operation.

If the synchronous point is not detected at the time the multiply-accumulate operation is ended, the code acquisition results in failure. In this case, the multiply-accumulate operation is repeated until the synchronous point is detected, while relatively shifting the periods of the received signal and the spread code by a predetermined time period. In the example of FIG. 2, the synchronous point is detected at a time t6, after the multiply-accumulate operation is repeated several times. Since the code acquisition results in success at the time t6, a despread process is performed after the time t6 by maintaining synchronization between the received signal and the spread code. Maintaining synchronization is generally called "tracking".

For convenience in explanation, in the example of FIG. 2, each bit of data is spread into seven chips. Therefore, the code acquisition succeeds on the sixth try after being failed five times. However when each bit of data is spread into several dozen or hundred chips, the number of times the code acquisition failed may be increased, and accordingly, the time taken until the code acquisition succeeds may be increased. Further, when taking into consideration a difference in a chip, there is a need to perform the code acquisition at several sampling points in one chip. As a result, the time taken until the code acquisition succeeds may be more increased.

The present inventors have conducted an experiment and a simulation to estimate how much difference occurs between the reference period and the received signal. In the in-vehicle RF receiver 3, the code acquisition is performed in a range where the difference is estimated to occur by using the sliding correlator 35 or a matched filter.

Specifically, first and second correction times T1, T2 are determined in advance based on the estimated difference. A search start point is defined such that a time difference between the search start point and a starting point of the reference period becomes equal to the first correction time T1. Therefore, the in-vehicle RF receiver 3 can identify the search start point based on the reference period and the first correction time T1. A search end point is defined such that a time difference between the search end point and the start point of the reference period becomes equal to the second correction time T2. Therefore, the in-vehicle RF receiver 3 can identify the search start point based on the reference period and the first correction time T1. A time interval from the search start point to the search end point is defined as a search period that is shorter than the reference period. The in-vehicle RF receiver 3 can identify the search period.

The above described search period surely includes a start pointing of the period of the received signal, even when the period difference between the reference signal and the received signal occurs. The in-vehicle RF receiver 3 performs the code acquisition by using the sliding correlator 35 for only a portion of the received signal having a starting point in the search period. In such an approach, the synchronous point can be efficiently detected.

More specifically, the CPU 39 identifies the search start and end points based on the first and second correction times T1, T2 and the synchronous signal (i.e., reference period) received from the CPU 11. Then, the CPU 39 transmits a control signal (i.e., synchronization point detection start and end control signals) indicating the identified search start and end points to the sliding correlator 35.

For example, even when the in-vehicle RF receiver 3 starts to receive the received signal at the time t1 so that the code acquisition can start at the time t2, the sliding correlator 35 does not perform the code acquisition immediately. The sliding correlator 35 waits for the synchronization point detection start signal from the CPU 39. In FIG. 2, the sliding correlator 35 receives the synchronization point detection start signal at a time t3 and receives the synchronization point detection end control signal at a time t4. In this case, a time interval from the time t3 to the time t4 is defined as the search period. The sliding correlator 35 performs the code acquisition for a period having a start pointing in the search period.

In FIG. 2, the synchronous code acquisition performed by using the control signal succeeds at the time t5 at which one period of the received signal having a starting point of the time t3 is completed. The despread process is performed after the time t5 by maintaining synchronization between the received signal and the spread code.

In FIG. 2, it happens that the code acquisition succeeds in the shortest time. Even when the code acquisition is performed for only the period having the starting point in the search period, there is a possibility that the code acquisition fails several times depending on a range of the search period. Generally, when each bit of data is spread into dozen or hundred chips, there is a possibility that code acquisition fails several dozen or hundred times. By narrowing down the search range to 1/n of the entire period, the number of times the code acquisition fails is reduced to 1/n.

For example, it is assumed that a transmission speed is 1/Abps, the sum of variations of a radio wave propagation time and a circuit delay time is L seconds (A>L). In this case, the search range for the code acquisition is reduced to a period of L seconds from a period of A seconds. This means that the number of processing for the code acquisition is reduced to L/A. Therefore, when the time taken to complete the code acquisition by using only a typical sliding correlator or a matched filter is B seconds, the time can be reduced to B(L/A) seconds by narrowing down the search range.

Specifically, it is assumed that the transmission speed is 1 kbps (i.e., A=1 ms), the sum of variations is 200 μs, and the time taken to complete the code acquisition by using only a typical sliding correlator is 500 ms (i.e., B=500 ms). In this case, in the in-vehicle RF receiver 3, the search range for the code acquisition is reduced to 200 μs from 1.0 ms so that the time can be reduced to 100 ms (=500 ms (200 μs/1.0 ms)).

As described above, according to the embodiment, there is no need to perform the code acquisition for all the periods having starting points in one period of the reference period. Therefore, as compared to a typical code acquisition method in which the code acquisition is performed without adjusting synchronization based on the synchronization signal, the time taken to complete the code acquisition can be greatly reduced. Accordingly, system responsivity can be improved.

(Keyless Smart Entry System Procedure)

Figure 3:
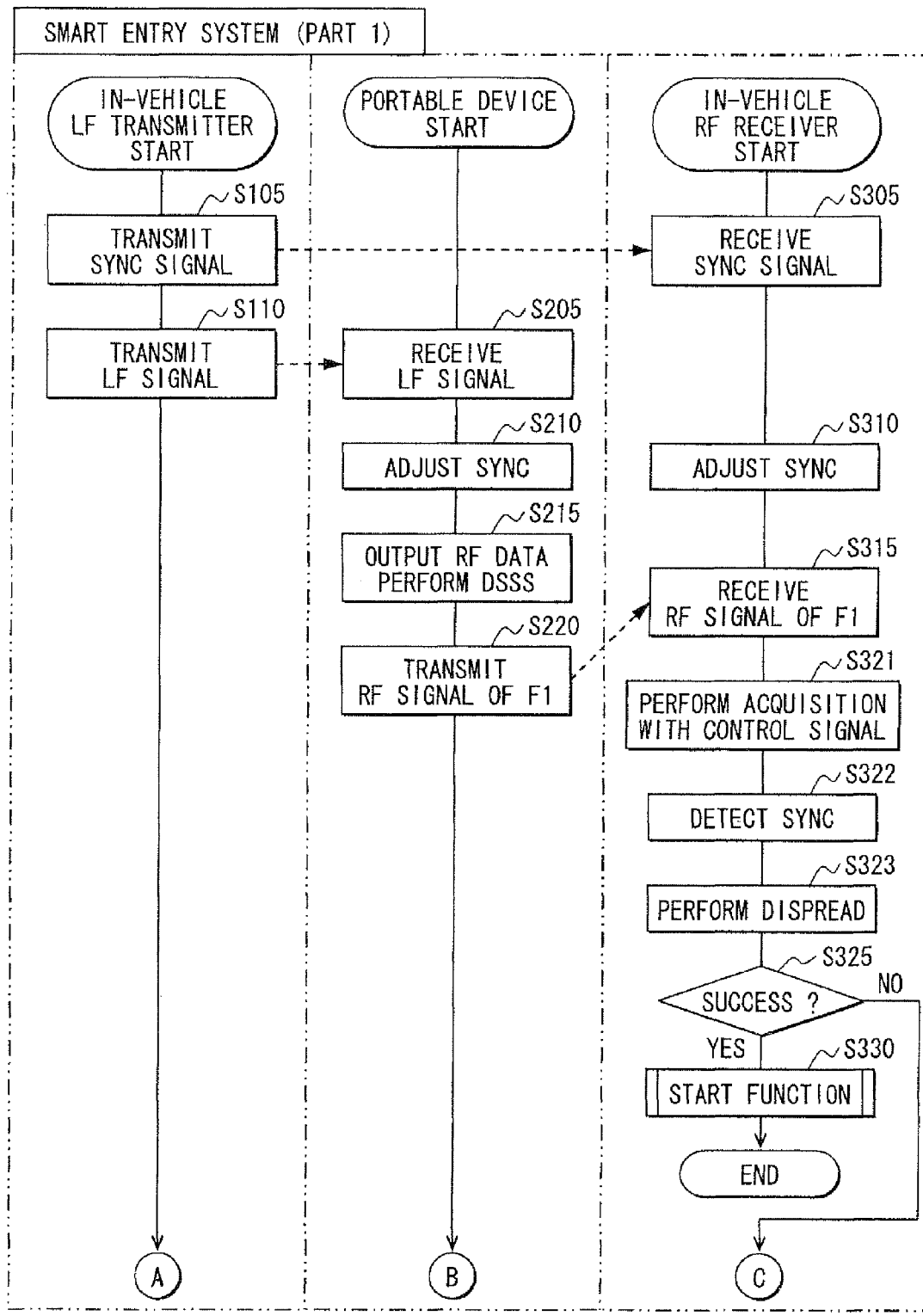
FIG. 3 is a flow diagram illustrating a first part of a procedure performed when a keyless smart entry system is used.
Figure 4:
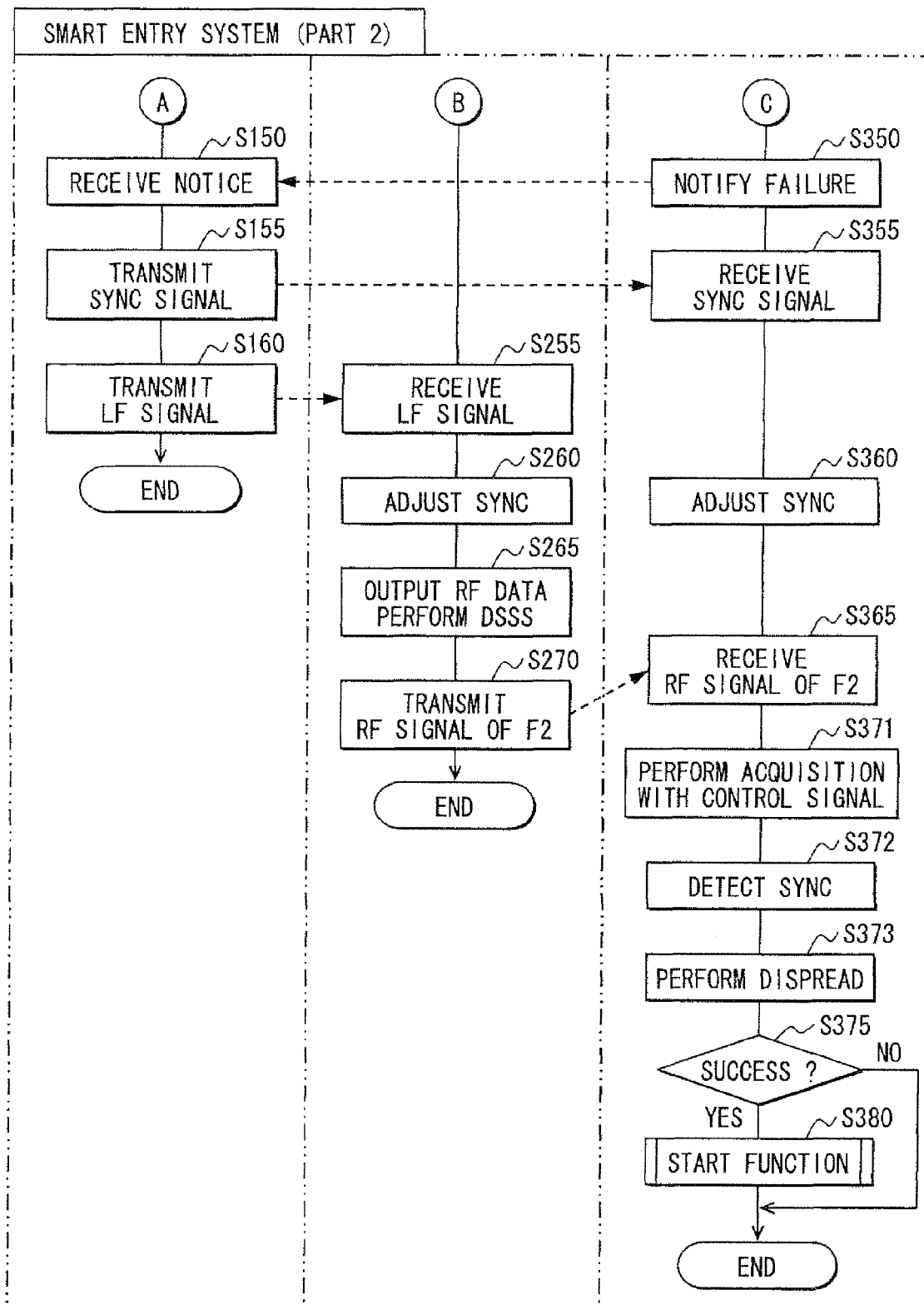
FIG. 4 is a flow diagram illustrating a second part of the procedure performed following the first part when the keyless smart entry function is used.

FIGS. 3 and 4 are diagrams illustrating flow charts of a keyless smart entry system procedure. The keyless smart entry system procedure is performed by the in-vehicle LF transmitter 1, the portable device 2, and the in-vehicle RF receiver 3, when the keyless smart entry function is used in the wireless communication system.

The keyless smart entry system procedure is started, when the portable device 2 outputs a response signal in response to a request signal from the in-vehicle LF transmitter 1. That is, the in-vehicle LF transmitter 1 has an initiative to start the keyless smart entry system procedure.

Specifically, while the in-vehicle LF transmitter 1 transmits a synchronization signal to the in-vehicle RF receiver 3 at S105 while transmitting a LF wireless signal (i.e., request signal) containing a synchronization signal to the portable device 2 at S110.

At S305, the in-vehicle RF receiver 3 receives the synchronization signal that is transmitted at S105. At S205, the portable device 2 receives the synchronization signal that is transmitted at S110, if the portable device 2 is located in a predetermined communication area around the vehicle.

In the flow chart in FIG. 3, for convenience in explanation, the in-vehicle LF transmitter 1 transmits the synchronization signal to the portable device 2 after transmitting the synchronization signal to the in-vehicle RF receiver 3. If the portable device 2 and the in-vehicle RF receiver 3 synchronize with each other in a process described later, the order of transmission of the synchronization signals is not limited to the order shown in the flow chart in FIG. 3. That is, the in-vehicle LF transmitter 1 can transmit the synchronization signal to the portable device 2 before transmitting the synchronization signal to the in-vehicle RF receiver 3.

The synchronization signal transmitted to the portable device 2 and the synchronization signal transmitted to the in-vehicle RF receiver 3 can have the same data structure or different data structures.

The portable device 2 performs a synchronous adjustment process at S210 based on the synchronization signal that is received at S205. Specifically, at S210, a period of a spread code outputted from the CPU 24 to the XOR operation circuit 25 is adjusted to be equal to a period indicated by the synchronization signal.

At S215, the portable device 2 performs a spread process by using the spread code having the period adjusted at S210, thereby generating a RF wireless signal (i.e., response signal). Specifically, at S215, the portable device 2 performs a RF data output process and a direct sequence spread spectrum (DSSS) process. At S220, the portable device 2 transmits the RF wireless signal.

In the embodiment, the RF wireless signal transmitted at S220 has a frequency of F1. For example, the frequency of F1 can be preset in the wireless communication system. Alternatively, the frequency of F1 can be informed to the portable device 2 from the in-vehicle LF transmitter 1, when the LF wireless signal is transmitted to the portable device 2 from the in-vehicle LF transmitter 1 through S110 and S205.

Like the portable device 2, the in-vehicle RF receiver 3 performs a synchronous adjustment process at S310 based on the synchronization signal that is received at S305. Specifically, at S310, a period of a spread code outputted from the CPU 39 to the XOR operation circuit 38 is adjusted to be equal to a period indicated by the synchronization signal.

At S315, the in-vehicle RF receiver 3 receives the RF wireless signal (i.e., response signal) that is transmitted at S220 and has the frequency of F1.

When receiving the RF wireless signal at S315, the in-vehicle RF receiver 3 performs a code acquisition process at S321 by using the above described synchronization point detection start and end control signals, thereby detecting the synchronization point at S322. The code acquisition process performed at S322 can greatly reduce the time taken to detect the synchronization point as compared to a typical code acquisition process in which the synchronization point is detected by using a sliding correlator (or a matched filter) while shifting the starting point over the entire period.

At S323, the in-vehicle RF receiver 3 performs a despread process based on the synchronization point that is detected at S322. At S325, the in-vehicle RF receiver 3 determines whether the despread process results in success. If the despread process results in success corresponding to YES at S325, the in-vehicle RF receiver 3 performs an initial process at S330.

For example, in the initial process performed at S330, authentication of the portable device 2 can be performed based on information contained in the received signal from the portable device 2. Upon success of the authentication, the in-vehicle RF receiver 3 can perform processing necessary to control the keyless smart entry function. As described previously, another circuit can perform the processing necessary to control the keyless smart entry function. In such a case, the in-vehicle RF receiver 3 can transmit to the other circuit a signal indicating that the authentication results in success.

In contrast, if the despread process results in failure corresponding to NO at S325, the in-vehicle RF receiver 3 transmits a failure signal, indicting that the despread process results in failure, to the in-vehicle LF transmitter 1 at S350 (refer to FIG. 4). For example, the failure in the despread process may be caused by exogenous noise that prevents normal wireless communication in the frequency of F1.

In this case, the in-vehicle LF transmitter 1 receives the failure signal from the in-vehicle RF receiver 3 at S150. Then, while the in-vehicle LF transmitter 1 transmits a synchronization signal to the in-vehicle RF receiver 3 at S155 while transmitting a LF wireless signal (i.e., request signal) containing a synchronization signal and a frequency change signal to the portable device 2 at S160.

The frequency change signal notifies the in-vehicle RE receiver 3 that a frequency of F2 different than the frequency of F1 is used.

At S355, the in-vehicle RF receiving device receives the synchronization signal that is transmitted at S155. At S255, the portable device 2 receives the synchronization signal and the frequency change signal that are transmitted at S160, if the portable device 2 is located in the predetermined communication area around the vehicle.

Like at S210, the portable device 2 performs the synchronous adjustment process at S260 based on the synchronization signal that is received at S255. At S265, the portable device 2 performs a spread process by using a spread code having a period adjusted at S260, thereby generating a RF wireless signal (i.e., response signal) having the frequency of F2. Specifically, at S265, the portable device 2 performs the RE data output process and the DSSS process. At S270, the portable device 2 transmits the RF wireless signal. Since the RF wireless signal has the frequency of F2, the RF wireless signal does not affected by exogenous noise that prevents normal wireless communication in the frequency of F1.

Like at S310, the in-vehicle RF receiver 3 performs a synchronous adjustment process at S360 based on the synchronization signal that is received at S355. At S365, the in-vehicle RF receiver 3 receives the RF wireless signal (i.e., response signal) that is transmitted at S270 and has the frequency of F2.

When receiving the RF wireless signal at S365, the in-vehicle RF receiver 3 performs the code acquisition process at S371 by using the above described synchronization point detection start and end control signals, thereby detecting the synchronization point at S372. The code acquisition process performed at S372 can greatly reduce the time taken to detect the synchronization point as compared to a typical code acquisition process in which the synchronization point is detected by using a sliding correlator (or a matched filter) while shifting the starting point over the entire period.

At S373, the in-vehicle RF receiver 3 performs a despread process based on the synchronization point that is detected at S372. At S375, the in-vehicle RF receiver 3 determines whether the despread process results in success. If the despread process results in success corresponding to YES at S375, the in-vehicle RF receiver 3 performs the initial process at S380.

In contrast, if the despread process results in failure corresponding to NO at S375, the smart entry system procedure is ended. That is, in the embodiment, when the first attempt to establish RE communication at the frequency of F1 results in failure, the second attempt to establish RE communication at the frequency of F2 is conducted. However, if the second try results in failure, the RF communication is abandoned so that information cannot be received from the portable device 2.

(Keyless Remote Entry System Procedure)

Figure 5:
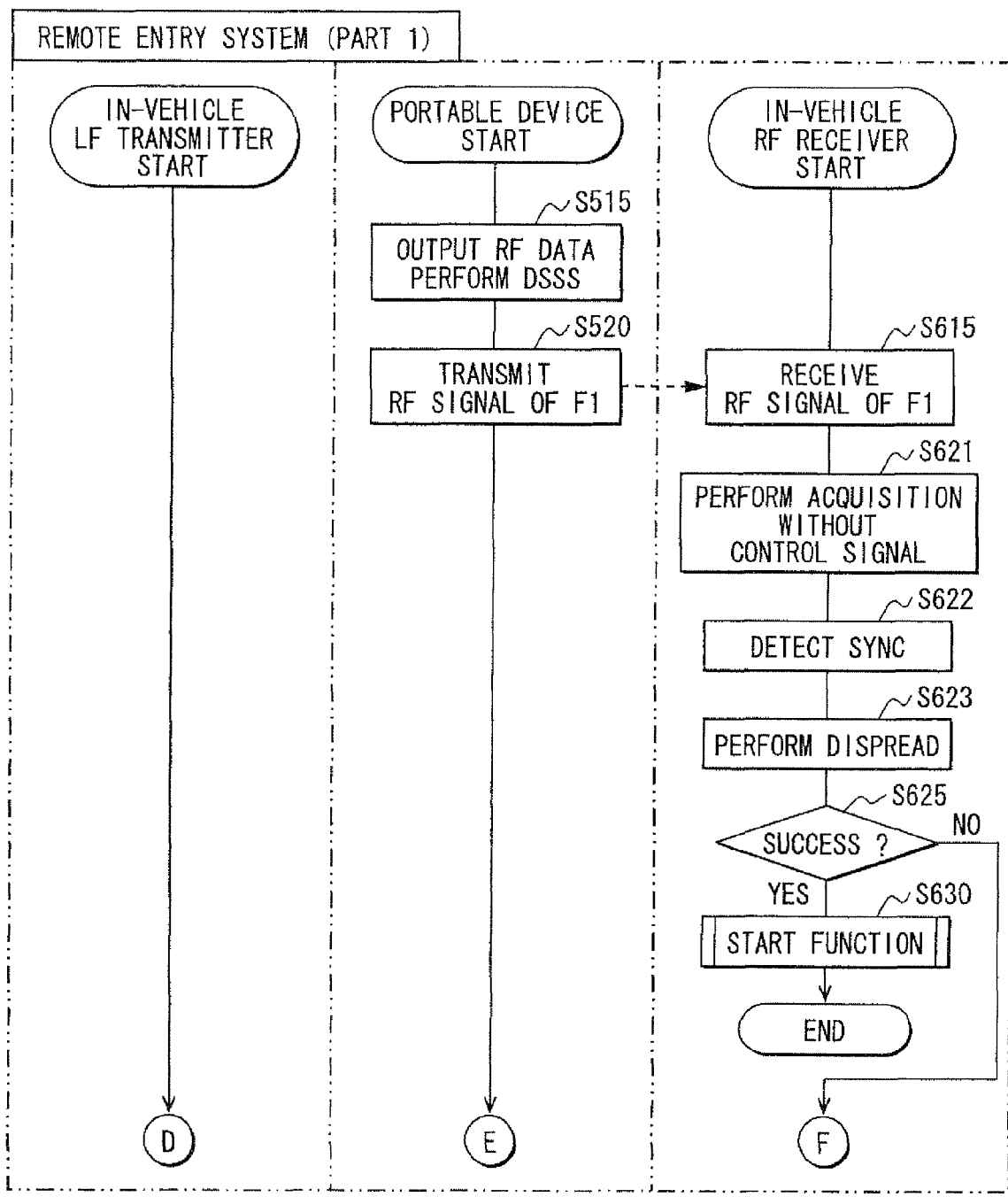
FIG. 5 is a flow diagram illustrating a first part of a procedure performed when a keyless remote entry system is used.
Figure 6:
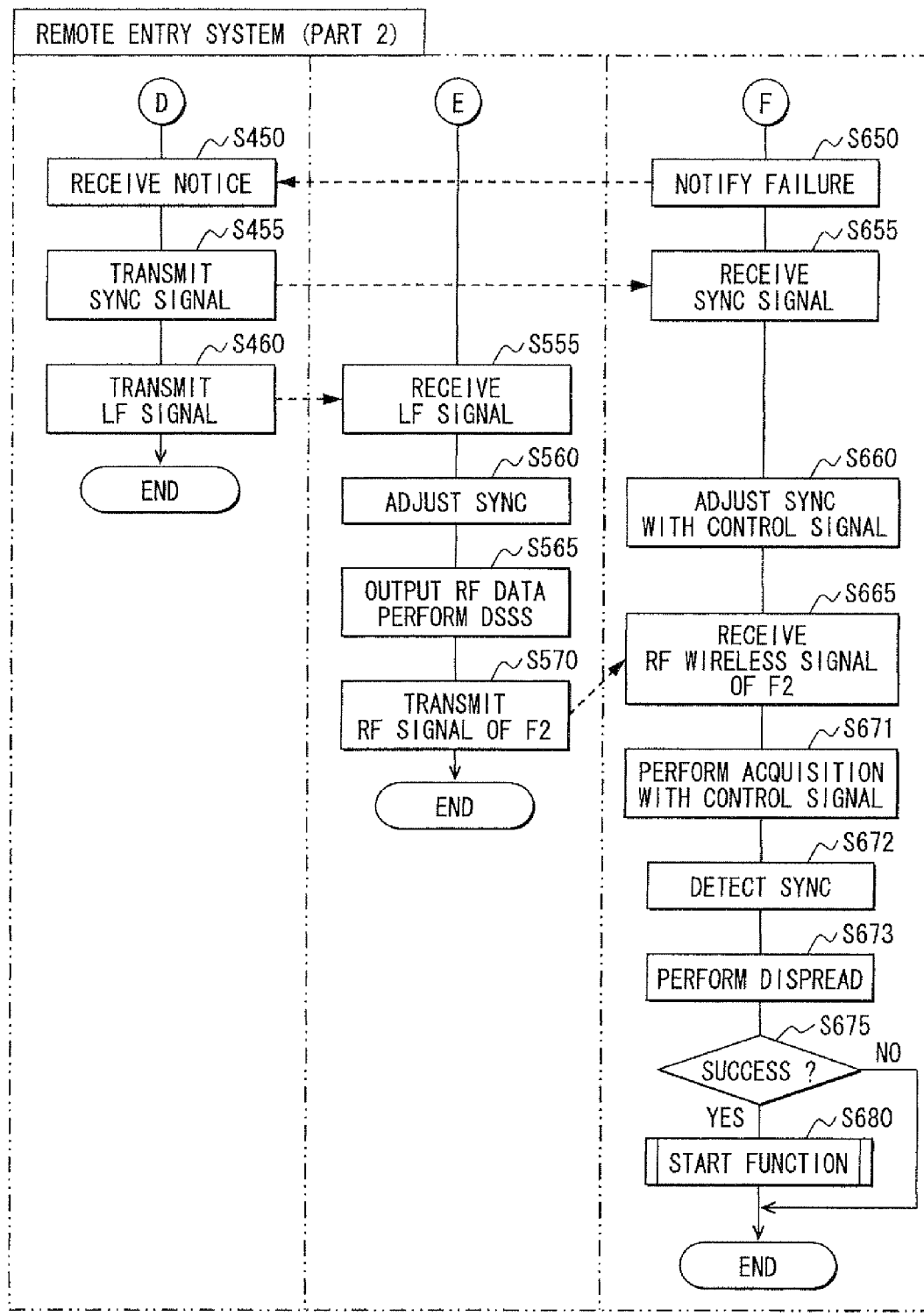
FIG. 6 is a flow diagram illustrating a second part of the procedure performed following the first part when the keyless remote entry system is used.

FIGS. 5 and 6 are diagrams illustrating flow charts of a keyless remote entry system procedure. The keyless remote entry system procedure is performed by the in-vehicle LF transmitter 1, the portable device 2, and the in-vehicle RF receiver 3, when the keyless remote entry function is used in the wireless communication system.

The keyless remote entry system procedure is started, when the in-vehicle LF transmitter 1 outputs a response signal in response to a command signal from the portable device 2. That is, the portable device 2 has an initiative to start the keyless remote entry system procedure.

Specifically, when a user of the vehicle operates a control portion (not shown) such as a button of the portable device 2, the portable device 2 performs a spread process at S515 by using a spread code, thereby generating a RF wireless signal (i.e., command signal) having a frequency of F1. Specifically, at S515, the portable device 2 performs the RF data output process and the DSSS process. At S520, the portable device 2 transmits the RF wireless signal.

Unlike the spread code used at S215 in the keyless smart entry procedure, the spread code used at S515 is asynchronous with the in-vehicle RF receiver 3.

At S615, the in-vehicle RF receiver 3 receives the RF wireless signal (i.e., command signal) that is transmitted at S520 and has the frequency of F1.

When receiving the RF wireless signal at S615, the in-vehicle RF receiver 3 performs a typical code acquisition process at S6211 thereby detecting a synchronization point at S622. In the typical code acquisition process performed at S621, the synchronization point is detected by using a sliding correlator (or a matched filter) while shifting the starting point over the entire period. It is noted that the synchronization point detection start and end control signals are not used at S621.

At S623, the in-vehicle RF receiver 3 performs a despread process based on the synchronization point that is detected at S622. At S625, the in-vehicle RF receiver 3 determines whether the despread process results in success. If the despread process results in success corresponding to YES at S625, the in-vehicle RF receiver 3 performs an initial control process at S630. For example, in the initial process performed at S630, the authentication of the portable device 2 can be performed based on information contained in the received signal from the portable device 2. Upon success of the authentication, the in-vehicle RF receiver 3 can perform processing necessary to control the keyless remote entry function. As described previously, another circuit can perform the processing necessary to control the keyless remote entry function. In such a case, the in-vehicle RF receiver 3 can transmit to the other circuit a signal indicating that the authentication results in success.

In contrast, if the despread process results in failure corresponding to NO at S625, the in-vehicle RF receiver 3 transmits a failure signal, indicating that the despread process results in failure, to the in-vehicle LF transmitter 1 at S650 (refer to FIG. 6). For example, the failure in the despread process may be caused by exogenous noise that prevents normal wireless communication in the frequency of F1.

In this case, the in-vehicle LF transmitter 1 receives the failure signal from the in-vehicle RF receiver 3 at S450. Then, while the in-vehicle LF transmitter 1 transmits a synchronization signal to the in-vehicle RF receiver 3 at S455 while transmitting a LF wireless signal (i.e., recommand signal) containing a synchronization signal and a frequency change signal to the portable device 2 at S460. The frequency change signal notifies the in-vehicle RF receiver 3 that a frequency of F2 different than the frequency of F1 is used.

At S655, the in-vehicle RF receiver 3 receives the synchronization signal that is transmitted at S455. At 555, the portable device 2 receives the synchronization signal and the frequency change signal that are transmitted at S460, if the portable device 2 is located in the predetermined communication area around the vehicle.

The portable device 2 performs a synchronous adjustment process at S560 based on the synchronization signal that is received at S555. Specifically, at S560, the period of the spread code outputted from the CPU 24 to the XOR operation circuit 25 is adjusted to be equal to a period indicated by the synchronization signal.

At S565, the portable device 2 performs a spread process by using the spread code having the period adjusted at S560, thereby generating a RF wireless signal (i.e., command signal) having the frequency of F2. Specifically, at S565, the portable device 2 performs the RF data output process and the DSSS process. At S570, the portable device 2 transmits the RF wireless signal. Since the RF wireless signal has the frequency of F2, the RF wireless signal does not affected by exogenous noise that prevents normal wireless communication in the frequency of F1.

Like the portable device 2, the in-vehicle RF receiver 3 performs a synchronous adjustment process at S660 based on the synchronization signal that is received at S655. Specifically, at S660, the period of the spread code outputted from the CPU 39 to the XOR operation circuit 38 is adjusted to be equal to a period indicated by the synchronization signal.

At S665, the in-vehicle RF receiver 3 receives the RF wireless signal (i.e., command signal) that is transmitted at S570 and has the frequency of F2.

When receiving the RF wireless signal at S665, the in-vehicle RF receiver 3 performs the code acquisition process at S371 by using the above described synchronization point detection start and end control signals, thereby detecting the synchronization point at S672.

It is noted that although the code acquisition process performed at S621 does not use the synchronization point detection start and end control signals, the code acquisition process performed at S672 uses the synchronization point detection start and end control signals. Therefore, as described above, the code acquisition process performed at S672 can greatly reduce the time taken to detect the synchronization point as compared to a typical code acquisition process in which the synchronization point is detected by using a sliding correlator (or a matched filter) while shifting the starting point over the entire period.

At S673, the in-vehicle RF receiver 3 performs a despread process based on the synchronization point that is detected at S672. At S6757 the in-vehicle RF receiver 3 determines whether the despread process results in success. If the despread process results in success corresponding to YES at S675, the in-vehicle RF receiver 3 performs the initial control process at S680.

In contrast, if the despread process results in failure corresponding to NO at S675, the smart entry system procedure is ended. That is, in the embodiment, when the first try to establish RF communication at the frequency of F1 results in failure, the second try to establish RF communication at the frequency of F2 is conducted. However, if the second try results in failure, the RF communication is abandoned so that information cannot be received from the portable device 2.

As described above, according to the wireless communication system, the in-vehicle LF transmitter 1, the portable device 2, and the in-vehicle RF receiver 3, synchronize with each other based on the synchronization signal. When code acquisition is performed by using the sliding correlator 35, the search range is narrowed down to a period having a starting point in a predetermined search period.

Since there is no need to perform the code acquisition for all the periods having starting points in one period of the reference period, the time taken to complete the code acquisition can be greatly reduced as compared to a typical code acquisition method in which the code acquisition is performed without adjusting synchronization based on the synchronization signal. Accordingly, system responsivity can be improved.

In particular, when the keyless smart entry function is used, the portable device 2 and the in-vehicle RF receiver 3 synchronize with each other already at the time of the first RF communication. Therefore, good responsivity can be achieved.

In contrast, when the keyless remote entry function is used, code acquisition in the first RF communication is performed in a conventional manner. However, code acquisition in the second or more RF communication can be completed immediately. Therefore, when the first RF communication results in failure, responsivity in the second or more RF communication can be improved.

In addition, according to the wireless communication system, the RF communication is performed by a spread spectrum method. In such an approach, noise resistance can be improved. Further, when the first RF communication results in failure, the second RF communication is established by changing a transmission frequency. Thus, the noise resistance can be improved.

(Modification)

The embodiments described above can be modified in various ways.

For example, in the embodiment, a direct sequence spread spectrum (DSSS) is used. Alternatively, a frequency-hopping spread spectrum (FHSS) can be used instead of the DSSS. Further alternatively, the DSSS and the FHSS can be used in conjunction with each other.

The RF communication is retried twice in total by using the frequencies F1, F2. Alternatively, the RF communication can be retried twice in total by using one of the frequencies F1, F2. Further alternatively, the RF communication can be retried three times or more by using the frequencies F1, F2, by using one of the frequencies F1, F2, or by using other frequencies.

In each of the keyless smart entry function and the keyless remote entry function, the communication is established by a spread spectrum method and retried when resulting in failure. Alternatively, in only the keyless smart entry function, the communication can be established by a spread spectrum method and retried when resulting in failure. Further alternatively, in only the keyless remote entry function, the communication can be established by a spread spectrum method and retried when resulting in failure.

In the embodiment, a typical code acquisition method or a special code acquisition method in which a search range for the code acquisition is narrowed down based on the synchronization signal from the in-vehicle LF transmitter 1 is used depending on the situation. Alternatively, these two methods can be used in conjunction with each other.

Specifically, the typical code acquisition method can be performed while narrowing down the search range based on the synchronization signal from the in-vehicle LF transmitter 1. In such an approach, it can be examined whether the search range is suitably narrowed down based on the synchronization signal from the in-vehicle LF transmitter 1. If the search range is not suitably narrowed down based on the synchronization signal from the in-vehicle LF transmitter 1, the code acquisition can be switched to the typical code acquisition method.

In most cases, the search range can be narrowed down based on the synchronization signal from the in-vehicle LF transmitter 1 so that the code acquisition can be completed in a short time. Even if the search range is not suitably narrowed down due to, for example, the code acquisition is switched to the typical code acquisition method. Thus, the code acquisition can be surely achieved.

Such changes and modifications are to be understood as being within the scope of the present invention as defined by the appended claims.

What is claimed is:

1. The wireless communication system comprising:
a portable device configured to spread a wireless signal by a first spread code to transmit a first spread wireless signal,
an in-vehicle device including a sliding correlator or a matched filter and configured to receive the first spread wireless signal, the in-vehicle device despreading the first spread wireless signal by a second spread code identical to the first spread code to wirelessly communicate with the portable device by a spread spectrum method,
wherein the in-vehicle device transmits a synchronization signal to the portable device to inform the portable device of a reference period determined by the in-vehicle device,
the portable device changes the first spread code synchronously with the synchronization signal upon reception of the synchronization signal and spreads the wireless signal by the changed first spread code to transmit a second spread wireless signal,
the in-vehicle device receives the second spread wireless signal and performs code acquisition for only a portion of the second spread wireless signal by using the sliding correlator or the matched filter, the portion of the second spread wireless signal having a starting point in a search period,
the in-vehicle device changes the second spread code synchronously with the second spread wireless signal upon success of the code acquisition and despreads the second spread wireless signal by the changed second spread code,
the search period is from a search start point to a search end point and shorter than the reference period,
the search start point is identified based on the reference period and a predetermined first correction time that is equal to a time difference between the search start point and a starting point of the reference period, and
the search end point is identified based on the reference period and a predetermined second correction time that is equal to a time difference between the search end point and the starting point of the reference period, and wherein the in-vehicle device transmits a first request signal to the portable device together with the synchronization signal,
the portable device changes the first spread code synchronously with the synchronization signal and spreads a first response signal having information by the changed first spread code upon reception of the first request signal to transmit a spread first response signal to the in-vehicle device,
the in-vehicle device receives the spread first response signal and performs the code acquisition for only a portion of the spread first response signal, the portion of the spread first response signal having a starting point in the search period,
the in-vehicle device changes the second spread code synchronously with the spread first response signal upon success of the code acquisition and despreads the spread first response signal by the changed second spread code to generate the first response signal having the information, and
the in-vehicle device performs authentication of the portable device based on the information and performs a predetermined control upon success of the authentication.

2. The wireless communication system according to claim 1, wherein the in-vehicle device transmits a second request signal to the portable device together with the synchronization signal upon abnormal reception of the spread first response signal from the portable device, the portable device changes the first spread code synchronously with the synchronization signal and spreads a second response signal having the information by the changed first spread code upon reception of the second request signal to transmit a spread second response signal to the in-vehicle device, the spread second response signal having a frequency different than a frequency of the spread first response signal, the in-vehicle device receives the spread second response signal and performs the code acquisition for only a portion of the spread second response signal, the portion of the spread second response signal having a starting point in the search period, the in-vehicle device changes the second spread code synchronously with the spread second response signal upon success of the code acquisition and despreads the spread second response signal by the changed second spread code to generate the second response signal having the information, and the in-vehicle device performs the authentication of the portable device based on the information and performs the predetermined control upon success of the authentication.

3. A wireless communication system comprising:
a portable device configured to spread a wireless signal by a first spread code to transmit a first spread wireless signal,
an in-vehicle device including a sliding correlator or a matched filter and configured to receive the first spread wireless signal, the in-vehicle device despreading the first spread wireless signal by a second spread code identical to the first spread code to wirelessly communicate with thesortable device by a spread spectrum method,
wherein the in-vehicle device transmits a synchronization signal to the portable device to inform the portable device of a reference period determined by the in-vehicle device,
the portable device changes the first spread code synchronously with the synchronization signal upon reception of the synchronization signal and spreads the wireless signal by the changed first spread code to transmit a second spread wireless signal, the in-vehicle device receives the second spread wireless signal and performs code acquisition for only a portion of the second spread wireless signal by using the sliding correlator or the matched filter, the portion of the second spread wireless signal having a starting point in a search period, the in-vehicle device changes the second spread code synchronously with the second spread wireless signal upon success of the code acquisition and despreads the second spread wireless signal by the changed second spread code, the search period is from a search start point to a search end point and shorter than the reference period, the search start point is identified based on the reference period and a predetermined first correction time that is equal to a time difference between the search start point and a starting point of the reference period, and the search end point is identified based on the reference period and a predetermined second correction time that is equal to a time difference between the search end point and the starting point of the reference period, and wherein the portable device changes the first spread code synchronously with a predetermined period determined by the portable device and spreads a first command signal having information by the changed first spread code to transmit a spread first command signal to the in-vehicle device, the in-vehicle device receives the spread first command signal and performs the code acquisition for the spread first command signal by using the sliding correlator or the matched filter, the in-vehicle device changes the second spread code synchronously with the spread first command signal upon success of the code acquisition and despreads the spread first command signal by the changed second spread code to generate the first command signal having the information, the in-vehicle device transmits a request signal to the portable device together with the synchronization signal upon abnormal reception of the spread first command signal from the portable device, the portable device changes the first spread code synchronously with the synchronization signal and spreads a second command signal having the information by the changed first spread code upon reception of the request signal to transmit a spread second command signal to the in-vehicle device, the spread second command signal having a frequency different than a frequency of the spread first command signal, the in-vehicle device receives the spread second command signal and performs the code acquisition for only a portion of the spread second command signal, the portion of the spread second command signal having a starting point in the search period, the in-vehicle device changes the second spread code synchronously with the spread second command signal upon success of the code acquisition and despreads the spread second command signal by the changed second spread code to generate the second command signal having the information, and the in-vehicle device performs the authentication of the portable device based on the information and performs a predetermined control upon success of the authentication.

* * * * *